United States Patent
Tabata

(10) Patent No.: US 10,190,484 B2
(45) Date of Patent: Jan. 29, 2019

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Masakazu Tabata, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 219 days.

(21) Appl. No.: 15/221,071

(22) Filed: Jul. 27, 2016

(65) Prior Publication Data
US 2017/0030259 A1 Feb. 2, 2017

(30) Foreign Application Priority Data

Jul. 31, 2015 (JP) ................................. 2015-152617

(51) Int. Cl.
| | | |
|---|---|---|
| F02B 33/44 | (2006.01) | |
| F02B 33/00 | (2006.01) | |
| F02D 23/00 | (2006.01) | |
| F02B 37/14 | (2006.01) | |
| F02B 37/04 | (2006.01) | |
| F02D 41/10 | (2006.01) | |
| F02B 37/18 | (2006.01) | |
| F02B 39/10 | (2006.01) | |
| F02D 23/02 | (2006.01) | |

(Continued)

(52) U.S. Cl.
CPC .............. *F02B 37/14* (2013.01); *F02B 37/04* (2013.01); *F02B 37/18* (2013.01); *F02B 39/10* (2013.01); *F02D 23/02* (2013.01); *F02D 41/0007* (2013.01); *F02D 41/10* (2013.01); *F02B 2037/125* (2013.01); *F02D 2200/0406* (2013.01); *Y02T 10/144* (2013.01)

(58) Field of Classification Search
CPC .......... F02B 37/14; F02B 37/04; F02B 37/18; F02B 39/10; F02B 2037/125; F02D 23/02; F02D 41/0007; F02D 41/10; F02D 2200/0406; Y02T 10/144
USPC ............... 60/602, 608–609, 605.1, 611–612; 123/562
See application file for complete search history.

(56) References Cited

U.S. PATENT DOCUMENTS 3,921,403 A * 11/1975 McInerney ............. F02B 37/04
  60/609
4,258,550 A * 3/1981 Hinkle .................... F02B 37/04
  60/609

(Continued)

FOREIGN PATENT DOCUMENTS

EP   3 103 991 A1   12/2016
GB      2143580 A *  2/1985 .............. F02B 37/04

(Continued)

Primary Examiner — Thai Ba Trieu
(74) Attorney, Agent, or Firm — Finnegan, Henderson, Farabow, Garrett & Dunner, LLP

(57) ABSTRACT

A control apparatus for controlling an internal combustion engine in which a first compressor and a second compressor are arranged in parallel in an intake passage may be configured, in a situation where supercharging by the second compressor is required at a time of a request to increase the engine torque, to start supercharging by the second compressor upon the elapse of a delay time that is started when the power of the first compressor is increased to a designated power value or more using an exhaust energy adjustment device.

3 Claims, 7 Drawing Sheets

(51) Int. Cl.
*F02D 41/00* (2006.01)
*F02B 37/12* (2006.01)

(56) References Cited

U.S. PATENT DOCUMENTS

| | | | | |
|---|---|---|---|---|
| 4,453,381 A * | 6/1984 | Dinger | ............... | F02B 39/10 60/612 |
| 4,669,269 A * | 6/1987 | Dinger | ............... | F02B 39/10 60/609 |
| 5,771,868 A * | 6/1998 | Khair | ............... | F02B 39/10 60/609 |
| 6,062,026 A * | 5/2000 | Woollenweber | ........ | F02B 39/10 60/612 |
| 6,907,867 B2 * | 6/2005 | Igarashi | ............... | F02B 39/10 60/608 |
| 6,938,420 B2 * | 9/2005 | Kawamura | ............ | F02B 39/10 60/609 |
| 2006/0207252 A1 * | 9/2006 | Isobe | ............... | F02D 41/0007 60/609 |
| 2014/0208745 A1 * | 7/2014 | Suhocki | ............... | F02B 39/10 60/611 |
| 2016/0061102 A1 * | 3/2016 | Sugiyama | ............... | F02B 39/10 60/611 |
| 2016/0061104 A1 * | 3/2016 | Hirayama | ........... | F02D 41/0007 60/602 |
| 2016/0076438 A1 * | 3/2016 | Tabata | ............... | F02D 41/0007 60/602 |
| 2016/0281652 A1 * | 9/2016 | Takasu | ............... | F02D 41/0007 |
| 2016/0348578 A1 * | 12/2016 | Oyagi | ............... | F02D 41/0007 |
| 2016/0363043 A1 * | 12/2016 | Hirayama | ........... | F02D 41/0007 |
| 2017/0002726 A1 * | 1/2017 | Iwamoto | ............... | F02D 41/0007 |
| 2017/0145905 A1 * | 5/2017 | Yamane | ............... | F02D 41/0007 |
| 2017/0145906 A1 * | 5/2017 | Tomita | ............... | F02D 41/0007 |
| 2017/0248068 A1 * | 8/2017 | Shutty | ............... | F02D 41/0007 |
| 2017/0335753 A1 * | 11/2017 | Xiao | ............... | F02D 41/0007 |
| 2018/0051638 A1 * | 2/2018 | Wang | ............... | F02D 41/0007 |
| 2018/0051642 A1 * | 2/2018 | Park | ............... | F02D 41/0007 |
| 2018/0058289 A1 * | 3/2018 | Lee | ............... | F02D 41/0007 |

FOREIGN PATENT DOCUMENTS

| | | | | |
|---|---|---|---|---|
| JP | 57212331 A * | 12/1982 | ............. | F02B 37/04 |
| JP | S63-018133 A | 1/1988 | | |
| JP | 6-207522 | 7/1994 | | |
| JP | 9-195781 | 7/1997 | | |
| JP | 2004-278430 | 10/2004 | | |
| JP | 2008-45524 | 2/2008 | | |
| JP | 2008-190412 | 8/2008 | | |
| JP | 2010048225 A * | 3/2010 | | |
| WO | WO 2017139822 A1 * | 8/2017 | ......... | F02D 41/0007 |

* cited by examiner

CONTROL APPARATUS FOR INTERNAL COMBUSTION ENGINE

CROSS-REFERENCE TO RELATED APPLICATION

This application is based on and claims the benefit of Japanese Patent Application No. 2015-152617, filed on Jul. 31, 2015, which is incorporated by reference herein in its entirety.

Embodiments of the present disclosure relates to a control apparatus for an internal combustion engine, and more particularly to a control apparatus for controlling an internal combustion engine in which a first compressor driven by exhaust gas and a second compressor driven by a power other than exhaust gas are arranged in parallel in an intake passage.

BACKGROUND

In Patent Document 1, a turbo-supercharger control apparatus for an internal combustion engine equipped with a first and a second turbo-supercharger is disclosed. The compressors of the first and second turbo-superchargers are arranged in parallel in an intake passage, and similarly, the turbines of the first and second turbo-superchargers are arranged in parallel in an exhaust passage. The first and second turbo-superchargers are each equipped with a variable nozzle as a variable supercharging device. An intake switching valve for regulating the flow rate of air that passes through the compressor of the second turbo-supercharger is arranged in the intake passage. An exhaust switching valve for regulating the flow rate of exhaust gas that flows into the turbine of the second turbo-supercharger is arranged in the exhaust passage. Further, the exhaust passage is equipped with an exhaust bypass passage that bypasses the exhaust switching valve at a position that is upstream of the turbine of the second turbo-supercharger, and an exhaust bypass valve that opens and closes the exhaust bypass passage.

According to the above described turbo-supercharger control apparatus, in a mode that performs supercharging using both the first and second turbo-supercharger, the opening degree of the variable nozzle of the first turbo-supercharger is controlled so that an air amount ratio between the two turbo-superchargers becomes a predetermined target air amount ratio. Further, when switching from a mode that uses only the first turbo-supercharger to the aforementioned mode that uses both of the turbo-superchargers, the following operation is executed to suppress torque shock. That is, when the intake switching valve, the exhaust switching valve and the exhaust bypass valve are each controlled from a closed state to an open state to perform the aforementioned mode switching, these three valves are opened in the order of exhaust bypass valve, exhaust switching valve and intake switching valve.

Following is a list of patent documents which may be related to the present disclosure
[Patent Document 1]
  JP 2008-190412 A
[Patent Document 2]
  JP 2004-278430 A
[Patent Document 3]
  JP 2008-045524 A
[Patent Document 4]
  JP 09-195781 A
[Patent Document 5]
  JP 06-207522 A An internal combustion engine may be equipped with a first supercharger (turbo-supercharger) having a first compressor that is driven by exhaust gas, and a second supercharger (for example, an electric supercharger) having a second compressor that is driven by a power other than exhaust gas, in which the first compressor and the second compressor are arranged in parallel in an intake passage. After a request is made to increase the engine torque in an internal combustion engine having such a configuration, the torque response can be improved by utilizing supercharging by the second compressor to assist supercharging by the first compressor. Therefore, where a torque request is made, it is desirable to promptly start supercharging by the second compressor. However, if supercharging by the second compressor is started in a state in which the power of the first compressor is small at a time of a torque request, a surge may occur in the first compressor. Once a surge occurs in the first compressor, the first compressor may remain stuck in the surge state while the second compressor is operating. Further, because the first compressor may not increase the supercharging pressure while a surge is occurring, the first compressor may not secure a high torque response. Therefore, it may be desired raise the power of the first compressor before starting supercharging by the second compressor. In order to raise the power of the first compressor in this way, it may be desired to provide a predetermined amount of energy to the first compressor during a period from receipt of a torque request to a start of supercharging by the second compressor. Accordingly, in order to raise the power of the first compressor before starting supercharging by the second compressor, it may be desired to appropriately adjust an opening degree of an exhaust energy adjustment device and the start timing of supercharging by the second compressor.

SUMMARY

Embodiments of the present disclosure provide a control apparatus for an internal combustion engine where a first compressor driven by exhaust gas and a second compressor driven by a power other than exhaust gas are arranged in parallel in an intake passage, the control apparatus being configured to prevent a surge in the first compressor from occurring due to a start of supercharging by the second compressor at a time of a request to increase engine torque.

A control apparatus for controlling an internal combustion engine according to embodiments of the present disclosure may be configured to control an internal combustion engine that includes: a turbine arranged in an exhaust passage of the internal combustion engine and configured to be driven by exhaust gas; a first compressor arranged in an intake passage of the internal combustion engine and configured to be driven by the turbine and to supercharge intake air; an exhaust energy adjustment device configured to adjust an amount of exhaust energy recovered by the turbine and to thereby change a power of the first compressor; a second compressor arranged in the intake passage and configured to be driven by a power other than exhaust gas and to supercharge intake air; and a supercharging control device configured to switch between execution of supercharging by the second compressor and stopping supercharging by the second compressor. The intake passage on a downstream side of the first compressor may be connected to the intake passage on a downstream side of the second compressor. The control apparatus may include a controller. The controller may be configured (i.e., programmed) to: control the exhaust energy adjustment device so that, in a situation where supercharging by the second compressor is required at a time of a request to increase engine torque, the power of the first compressor may be increased to a designated power value or more; and control the supercharging control device so that, upon an elapse of a delay time that is started when the power of the first compressor is increased to the designated power value or more, supercharging by the second compressor may start.

The delay time may be shorter with an increase in a degree of a request to increase engine torque.

The designated power value of the power of the first compressor may be smaller with an increase in the delay time.

According to embodiments of the present disclosure, the exhaust energy adjustment device may be controlled by the controller so that, in a situation where supercharging by the second compressor is required at a time of a request to increase the engine torque, the power of the first compressor may increase to a designated power value or more. Further, the supercharging control device may be controlled by the controller so that, upon an elapse of a delay time that is started when the power of the first compressor is increased to the designated power value or more, supercharging by the second compressor may be started. That is, according to embodiments of the present disclosure, an opening degree of the exhaust energy adjustment device and the start timing of supercharging by the second compressor can be appropriately adjusted so that supercharging by the second compressor is started after the power of the first compressor is increased. Thus, supercharging by the second compressor can be started after the power of the first compressor becomes higher in comparison to an example where supercharging by the second compressor is started immediately when the aforementioned request is made. As a result, in an internal combustion engine in which the first compressor and the second compressor are arranged in parallel in an intake passage, a surge in the first compressor can be prevented from occurring due to a start of supercharging by the second compressor.

DETAILED DESCRIPTION

[System Configuration]

Figure 1:
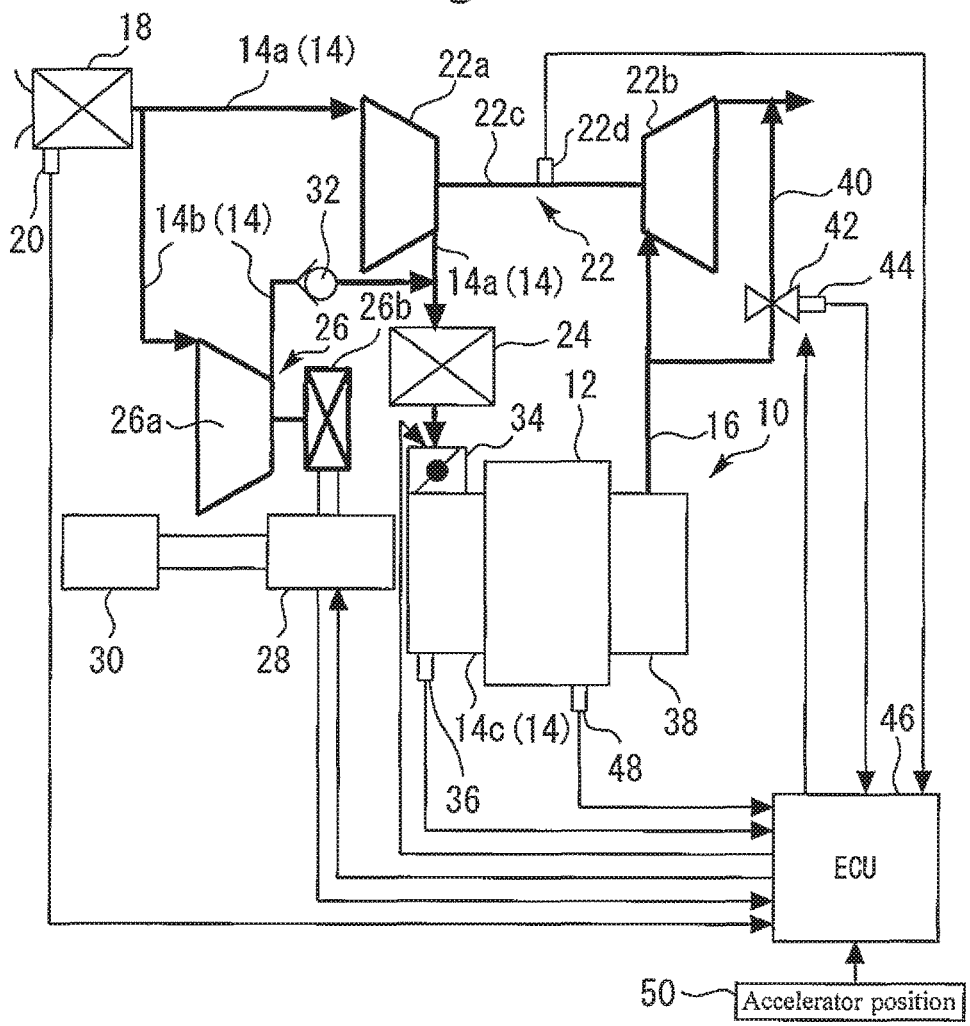
FIG. 1 is a view for schematically describing a configuration of a system according to embodiments of the present disclosure.

FIG. 1 is a view for schematically describing a configuration of a system according to an embodiment of the present disclosure. An internal combustion engine 10 illustrated in FIG. 1 includes an internal combustion engine main body 12. The internal combustion engine 10 is a spark-ignition engine (as one example, a gasoline engine) that is mounted in a vehicle and used as a power source thereof. An intake passage 14 and an exhaust passage 16 communicate with each cylinder of the internal combustion engine main body 12.

The intake passage 14 includes a first intake passage 14a through which air drawn into the respective cylinders of the internal combustion engine main body 12 flows. An air cleaner 18 is provided in the vicinity of an inlet of the first intake passage 14a. An air flow sensor 20 that outputs a signal that is in accordance with a flow rate of intake air that flows through the first intake passage 14a is attached to the air cleaner 18.

A compressor (hereunder, referred to as "turbo-compressor") 22a of a turbo-supercharger 22 for supercharging intake air is arranged in the first intake passage 14a on the downstream side of the air cleaner 18. A centrifugal compressor, a diagonal flow compressor or an axial-flow compressor can be used as the turbo-compressor 22a. The turbo-supercharger 22 includes a turbine 22b that is arranged in the exhaust passage 16. The turbo-compressor 22a is integrally connected to the turbine 22b through a connecting shaft 22c, and is rotationally driven by exhaust gas flowing through the turbine 22b. Further, a turbo speed sensor 22d for detecting a speed (hereunder, also referred to as "turbo speed") Nt of the turbo-compressor 22a is attached to the turbo-supercharger 22. In addition, an intercooler 24 for cooling intake air compressed by the turbo-compressor 22a or by both the turbo-compressor 22a and an electric compressor 26a, described later, is arranged in the first intake passage 14a at a position on the downstream side of the turbo-compressor 22a.

The intake passage 14 includes a second intake passage 14b. The second intake passage 14b connects a part on the upstream side of the turbo-compressor 22a in the first intake passage 14a with a part on the downstream side thereof in the first intake passage 14a. That is, the second intake passage 14b is an intake passage that bypasses the turbo-compressor 22a. A compressor (hereunder, referred to as "electric compressor") 26a of an electric supercharger 26 is arranged in the second intake passage 14b. According to this configuration of certain embodiments of the present disclosure, the turbo-compressor 22a and the electric compressor 26a are arranged in parallel in the intake passage 14. Note that, in the present description, as long as the downstream side of the turbo-compressor and the downstream side of the electric compressor are connected, a configuration in which a "first compressor" that is a turbo-compressor and a "second compressor" that is an electric compressor, for example, are arranged "in parallel" in an intake passage is not limited to the configuration as shown in FIG. 1 in which the upstream side of the turbo-compressor 22a and the upstream side of the electric compressor 26a are connected and the downstream side of the turbo-compressor 22a and the downstream side of the electric compressor 26a are connected. That is, a configuration may be adopted in which the upstream side of the "first compressor" and the upstream side of the "second compressor" are mutually independent. Accordingly, an air flow sensor and an air cleaner may be independently provided on the upstream side of the "first compressor" and on the upstream side of the "second compressor", respectively.

The electric compressor 26a is also a centrifugal compressor, a diagonal flow compressor or an axial-flow compressor. The electric compressor 26a is driven by an electric motor 26b. The electric motor 26b is electrically connected to a motor controller 28. The motor controller 28 controls energization of the electric motor 26b based on a command from an electronic control unit (ECU) 46 described later. Electric power from a battery 30 is supplied to the electric motor 26b. According to the electric supercharger 26, driving the electric compressor 26a by means of the electric motor 26b can supercharge intake air.

A check valve 32 is arranged in the second intake passage 14b on the downstream side of the electric compressor 26a. The check valve 32 is configured to allow a flow of air through the second intake passage 14b toward the intercooler 24 side, and to restrict a flow in the opposite direction thereto. Note that, instead of the check valve 32, an opening/closing valve (for example, an electromagnetic valve) may be provided that is configured to open the second intake passage 14b on the downstream side of the electric compressor 26a when the electric compressor 26a is operated, and to close the second intake passage 14b on the downstream side of the electric compressor 26a when the electric compressor 26a is not operated.

An electronically controlled throttle valve 34 is arranged in the first intake passage 14a at a position on the downstream side of the intercooler 24. The throttle valve 34 operates in accordance with an accelerator depression amount, and changes the intake air flow rate according to the accelerator depression amount. A part of the first intake passage 14a that is on the downstream side of the throttle valve 34 is formed by an intake manifold 14c. Intake air is distributed to the respective cylinders through the intake manifold 14c. An intake air pressure sensor 36 that detects the intake air pressure (intake manifold pressure) is attached to the intake manifold 14c.

Exhaust gas from the respective cylinders is collected by an exhaust manifold 38, which is a part of the exhaust passage 16, and discharged to the downstream side. An exhaust bypass passage 40 that bypasses the turbine 22b is connected to the exhaust passage 16. An electronically controlled waste gate valve (WGV) 42 is arranged in the exhaust bypass passage 40 as a bypass valve for opening and closing the exhaust bypass passage 40. By adjusting an opening degree of the WGV 42 within a predetermined opening degree control range, the amount of exhaust energy that the turbine 22b recovers can be controlled, and as a result the power of the turbo-compressor 22a can be changed. An opening degree sensor 44 for detecting the WGV opening degree is attached to the WGV 42. Note that a method for acquiring the WGV opening degree is not limited to a method that uses the opening degree sensor 44. That is, the WGV opening degree may be calculated based on, for example, a voltage or a current of an electrically-driven actuator (not illustrated in the drawings) that drives the WGV 42. In an example where the WGV that the internal combustion engine 10 includes is of a pressure regulating type, the WGV opening degree may be calculated based on a detected value or estimated value of a driving pressure (diaphragm pressure). In addition, when the WGV is closed, the intake manifold pressure rises and the exhaust pressure on the upstream side of the turbine also rises. Therefore, the WGV opening degree may be calculated based on the intake manifold pressure or the exhaust pressure on the upstream side of the turbine.

The system of certain embodiments of the present disclosure also includes, as a control apparatus that controls the internal combustion engine 10, an electronic control unit (ECU) 46 and drive circuits (not shown in the drawings) for driving various actuators described hereunder. The ECU 46 may be programmed to perform processes and functions of the present disclosure. The ECU 46 includes at least an input/output interface, a memory, and a central processing unit (CPU), and performs control of the entire system. The input/output interface is configured to receive sensor signals from various sensors installed in the internal combustion engine 10 or the vehicle in which the internal combustion engine 10 is mounted, and to output actuating signals to various actuators that the internal combustion engine 10 includes. Various control programs and maps for controlling the internal combustion engine 10 are stored in the memory of the ECU 46. The CPU reads out a control program from the memory and executes the control program, and generates actuating signals for various actuators based on the received sensor signals.

The sensors from which the ECU 46 receives signals include, in addition to the aforementioned air flow sensor 20, intake air pressure sensor 36 and opening degree sensor 44, various sensors for acquiring the engine operating state such as a crank angle sensor 48 for acquiring a rotational position of a crankshaft and the engine speed. The aforementioned sensors also include an accelerator position sensor 50 for detecting a depression amount of an accelerator pedal (accelerator position) of the vehicle in which the internal combustion engine 10 is mounted. In addition to the aforementioned electric motor 26b, throttle valve 34 and WGV 42, the actuators to which the ECU 46 outputs actuating signals also include various actuators (not shown in the drawings) for controlling engine operations such as fuel injection valves for supplying fuel to the respective cylinders and an ignition device for igniting an air-fuel mixture in the respective cylinders.

[Control of Embodiments of the Present Disclosure]
(Supercharging Assist by Electric Compressor)

As described above, the internal combustion engine 10 includes an electric supercharger 26 as well as a turbo-supercharger 22. The system of the disclosed embodiments of the present disclosure is configured to enable selection of a single supercharging mode and a twin supercharging mode. The single supercharging mode is a mode in which supercharging is performed using only the turbo-supercharger 22. Accordingly, operation of the electric compressor 26a is stopped in the single supercharging mode. On the other hand, the twin supercharging mode is a mode that performs supercharging using the electric supercharger 26 together with the turbo-supercharger 22. In the twin supercharging mode, supercharging by the turbo-compressor 22a is assisted by the electric compressor 26a. The twin supercharging mode is used at a time of a request to increase the engine torque (request to accelerate the vehicle) under circumstances in which the operating region of the internal combustion engine 10 is in a predetermined low-speed and low-load region. On the other hand, the single supercharging mode is used corresponds to a supercharging mode used at a time of supercharging being performed under circumstances other than a time at which the twin supercharging mode is used.

According to the electric supercharger 26 having a configuration that drives the electric compressor 26a by means of the electric motor 26b, the supercharging pressure can be increased with a higher responsiveness as compared to the turbo-supercharger 22 in which the turbo-compressor 22a is driven using exhaust gas. Therefore, the torque response (acceleration response) can be improved by selecting the twin supercharging mode at a time of a request to increase the engine torque (request to accelerate the vehicle).

(Problem During Operation of Electric Compressor)

Figure 2A:
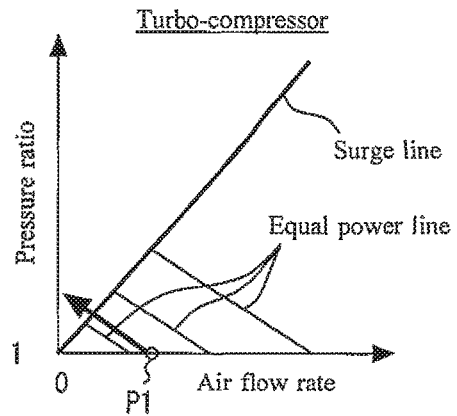
FIG. 2A and FIG. 2B are views for describing a problem that may arise when starting a twin supercharging mode at a time of a request to increase engine torque.
Figure 2B:
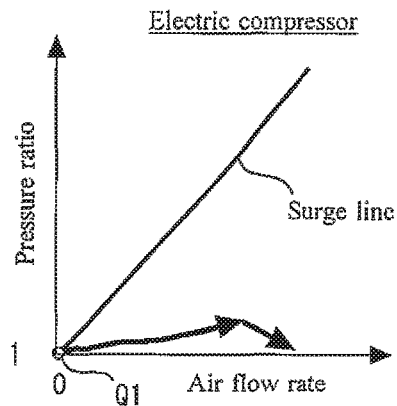

FIG. 2A and FIG. 2B illustrate a problem that may arise when starting the twin supercharging mode at a time of a request to increase the engine torque. FIG. 2A shows a compressor map relating to the turbo-compressor 22a, while FIG. 2B shows a compressor map relating to the electric compressor 26a. The vertical axis in each of these compressor maps represents a pressure ratio of the outlet pressure with respect to the inlet pressure (=outlet pressure/inlet pressure) of the respective compressors 22a and 26a. The horizontal axis in each of the compressor maps represents a flow rate of air that passes through the compressor 22a or 26a. In FIG. 2A and FIG. 2B, a region on the side of a low air flow rate and a high pressure ratio relative to a surge line corresponds to a surge region in which a surge occurs in the compressor 22a or 26a.

In the system of certain embodiments of the present disclosure, in order to improve fuel efficiency by reducing pumping loss, the WGV 42 is opened in a low load region in which supercharging by the turbo-supercharger 22 is not required. An operating point P1 shown in FIG. 2A corresponds to an operating point P of the turbo-compressor 22a in a state in which the WGV 42 is opened in this manner.

Here, an example is considered in which the twin supercharging mode is started to increase the engine torque from a state where the operating point P is at the operating point P1. Where the twin supercharging mode is started, the WGV 42 is closed to allow the turbo-compressor 22a to perform supercharging, and energization of the electric motor 26b is controlled to allow the electric compressor 26a to perform supercharging.

FIG. 2A and FIG. 2B correspond to an example in which, at a time point when a request to increase the engine torque is detected, an operation to close the WGV 42 and an operation to actuate the electric compressor 26a are started simultaneously. As described above, the internal combustion engine 10 includes the turbo-compressor 22a and the electric compressor 26a that are arranged in parallel in the intake passage 14 (14a, 14b). In an example where this kind of parallel arrangement is used, the downstream pressure of the turbo-compressor 22a and the downstream pressure of the electric compressor 26a become equal because the downstream side of the turbo-compressor 22a communicates with the downstream side of the electric compressor 26a. Further, in an example where the parallel arrangement is used, the flow rates of air passing through the compressors 22a and 26a depend on a ratio between the powers of the respective compressors 22a and 26a. In this example, the power of the turbo-compressor 22a is proportional to the flow rate of air that passes therethrough and the pressure ratio. This similarly applies with respect to the power of the electric compressor 26a.

The responsiveness of an increase in the power of the electric compressor 26a as a result of a start of operation of the electric compressor 26a is higher than that of the turbo-compressor 22a that employs exhaust gas as a motive power. Therefore, in a state in which the power of the turbo-compressor 22a is low because the WGV 42 is open, the following problem may arise if, at a time of a torque request, supercharging by the electric compressor 26a is immediately started at the same time as (corresponds to the example shown in FIG. 2A and FIG. 2B) or prior to an operation that closes the WGV 42. That is, the pressure ratio increases while the flow rate of air that passes through the turbo-compressor 22a decreases, and as a result a surge may occur in the turbo-compressor 22a.

More specifically, an increase in the power of the electric compressor 26a is faster that an increase in the power of the turbo-compressor 22a that is caused by closing the WGV 42. Consequently, in an example of a parallel arrangement, when supercharging by the electric compressor 26a is started in a state in which the power of the turbo-compressor 22a is low, the common downstream pressure of the turbo-compressor 22a and the electric compressor 26a is determined depending on the operating characteristics of the electric compressor 26a. Further, if supercharging by the electric compressor 26a is started in the above described state, the flow rate of air passing through the turbo-compressor 22a significantly decreases due to the outlet pressure of the turbo-compressor 22a rising. With respect to this operation, the operating point P moves in the left-upper direction in FIG. 2A (that is, the direction of a high pressure ratio and a low flow rate) from the operating point P1. If the amount of this movement is large, the operating point P may enter the surge region.

After actuating the electric compressor 26a, the flow rate of air passing through the electric compressor 26a increases. However, if a surge occurs in turbo-compressor 22a, air pressurized by the electric compressor 26a flows backward to the turbo-compressor 22a side. As a result, although an operating point Q of the electric compressor 26a moves in the rightward direction (that is, a high flow rate direction) in FIG. 2B from the operating point Q1 after starting the actuation of the electric compressor 26a, the pressure ratio of the electric compressor 26a after starting the actuation increases during a period until a surge occurs in the turbo-compressor 22a, and decreases after a surge occurs in the turbo-compressor 22a. In addition, if a surge occurs in the above described manner in the turbo-compressor 22a, since the turbo-compressor 22a enters a state in which the turbo-compressor 22a is incapable of increasing the pressure, the state in which a surge is occurring is continued.

If a surge occurs in the above described manner in the turbo-compressor 22a, even if the twin supercharging mode is started, it may not be possible to increase the supercharging pressure (that is, the intake pressure on the downstream side relative to a position at which intake air that passed through the turbo-compressor 22a and intake air that passed through the electric compressor 26a merge) of the overall system of the internal combustion engine 10. Note that, the above description concerns an example in which the electric compressor 26a is actuated from a state in which, as one example, the WGV 42 is opened to a maximum opening degree (full opening degree). However, even where the electric compressor 26a is actuated from a state in which the WGV 42 is closed to a desired opening degree, the above described problem arises if the power of the turbo-compressor 22a is low.

(Outline of Control)

Figure 3A:
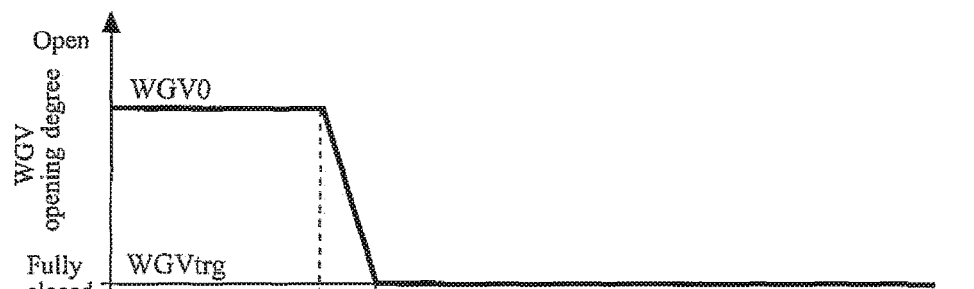
FIGS. 3A and 3B are time charts for describing control that is performed in embodiments of the present disclosure at a time of torque request that requires the twin supercharging mode.
Figure 3B:
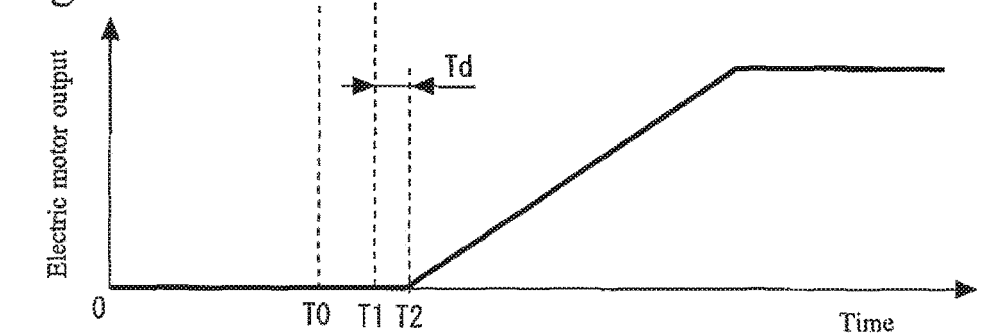
Figure 4A:
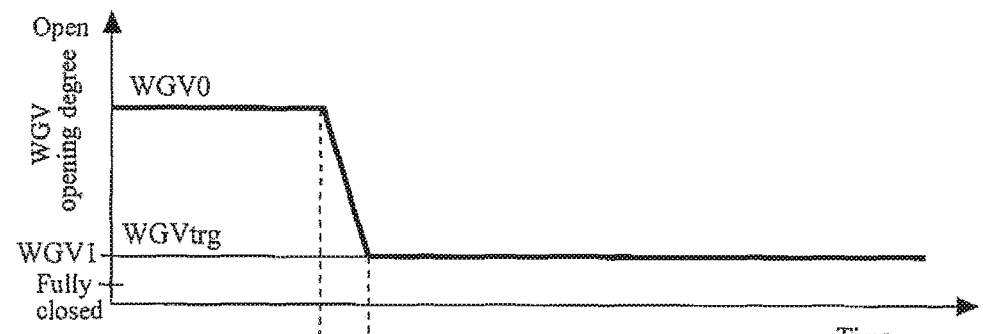
FIGS. 4A and 4B are time charts for describing control that is performed in embodiments of the present disclosure at a time of torque request that requires the twin supercharging mode.
Figure 4B:
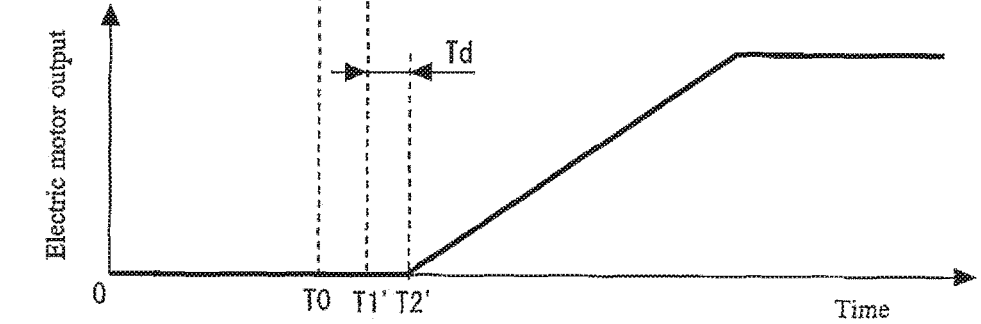

FIGS. 3A and 3B and FIGS. 4A and 4B are time charts for describing control that is performed in the embodiments of the present disclosure at a time of torque request that requires the twin supercharging mode. More specifically, FIG. 3A and FIG. 3B illustrate a control example where a target WGV opening degree WGVtrg of the WGV 42 is set to a minimum opening degree (as one example, the fully closed opening degree) within the aforementioned opening degree control range. FIG. 4A and FIG. 4B illustrate a control example where the target WGV opening degree WGVtrg is an opening degree WGV1 that is on the open side of the fully closed opening degree.

According to the control of certain embodiments of the present disclosure, as shown in FIGS. 3A and 3B and FIGS. 4A and 4B, after a torque request for which the twin supercharging mode is required is detected at a time point T0 (that is, in a situation where supercharging by the electric compressor 26a is required when a request to increase the engine torque is made), in order to increase the power of the turbo-compressor 22a, the WGV 42 is closed so as to have a target WGV opening degree WGVtrg.

A time point T1 in the example illustrated in FIG. 3A indicates a time point when the WGV opening degree arrives at the fully closed opening degree that is a target WGV opening degree WGVtrg. A time point T1' in the example illustrated in FIG. 4A indicates a time point when the WGV opening degree arrives at the opening degree WGV1 that is a target WGV opening degree WGVtrg. Note that, an opening degree WGV0 prior to receipt of the torque request is a WGV opening degree used in a low load region in which the engine torque is controlled with the throttle valve 34 without substantially utilizing supercharging by the turbo-compressor 22a. More specifically, the opening degree WGV0 is the maximum opening degree within the aforementioned opening degree control range (as one example, the full opening degree).

According to the control of certain embodiments of the present disclosure, actuation of the electric compressor 26a for a supercharging assist differs from the above described example described referring to FIG. 2A and FIG. 2B, and is not started immediately after detection of a torque request. That is, in the example illustrated in FIG. 3A and FIG. 3B, the start of supercharging by the electric compressor 26a is executed by energization of the electric motor 26b being started at a time point T2 that is upon the elapse of a delay time Td that is started from the time point T1 when the WGV opening degree reaches the target opening degree WGVtrg (fully closed opening degree). This also applies with respect to the example illustrated in FIG. 4A and FIG. 4B, in which supercharging by the electric compressor 26a is started by energization of the electric motor 26b being started at a time point T2' that is upon the elapse of a delay time Td that is started from the time point T1' when the WGV opening degree reaches the target opening degree WGVtrg (opening degree WGV1). Thereafter, the electric motor output is increased toward a predetermined output value for a time of a supercharging assist.

Figure 5A:
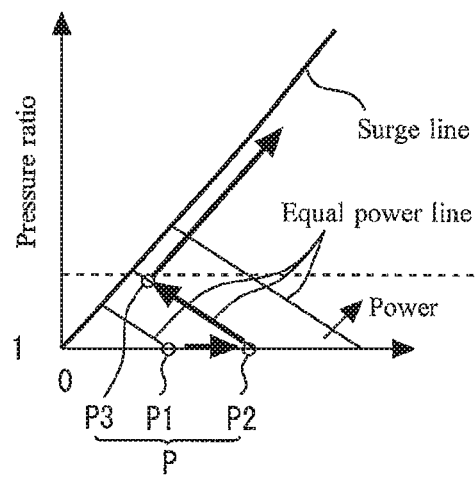
FIG. 5A and FIG. 5B are compressor maps for schematically describing the traces of the respective operating points of compressors in a situation where the control of embodiments of the present disclosure is performed.
Figure 5B:
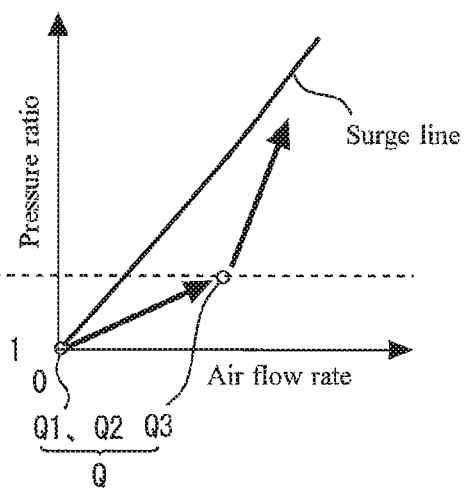

FIG. 5A and FIG. 5B are compressor maps for schematically describing the traces of the respective operating points of the compressors 22a and 26a in a situation where the control of certain embodiments of the present disclosure is performed. Note that, in FIG. 5A and FIG. 5B, operating points for which the numbers affixed to the respective operating points P and Q are the same (for example, P1 and Q1) represent operating points at the same time point.

As described above with reference to FIGS. 3A and 3B and FIGS. 4A and 4B, according to the control of certain embodiments of the present disclosure, at a time of detection of a torque request, the WGV 42 is closed so as to obtain the target WGV opening degree WGVtrg that is the opening degree WGV1 (WGV opening degree corresponding to a target power B described later) or the fully closed opening degree. As a result, when the power of the turbo-compressor 22a starts to increase accompanying closing of the WGV 42, the operating point P of the turbo-compressor 22a starts to move in the rightward direction (that is, a high flow rate direction) in FIG. 5A and FIG. 5B from the operating point P1 used at a time of detection of a torque request. This is because, in the initial stage of an increase in the power of the turbo-compressor 22a, although the outlet pressure is not yet increased, the flow rate of air passing through the turbo-compressor 22a is increased.

The operating point P arrives at the operating point P2 upon the elapse of a delay time Td that is started upon the WGV opening degree reaching the target WGV opening degree WGVtrg (that is, upon the power of the turbo-compressor 22a increasing to a value that is equal to or greater than a designated power value). Specifically, a d designated power value C1 or C2 described later corresponds to the aforementioned designated power value. According to the control of certain embodiments of the present disclosure, supercharging by the electric compressor 26a is started upon the elapse of the delay time Td. In accompaniment therewith, the operating point P departs from the operating point P2, and the operating point Q of the electric compressor 26a starts to move from the operating point Q2 (=operating point Q1).

When supercharging by the electric compressor 26a is started, because of the parallel arrangement, the outlet pressure of the turbo-compressor 22a increases with an increase in the outlet pressure of the electric compressor 26a, and the flow rate of air passing through the turbo-compressor 22a decreases. This operation corresponds to, on the compressor map, a movement of the operating point P in which the operating point P changes direction at the operating point P2 and moves in a state of substantially equal work in the left-upper direction in FIG. 5A (that is, the direction of a high pressure ratio and a low flow rate) from the operating point P2. More specifically, as described in the foregoing, in an example where the two compressors 22a and 26a are arranged in parallel, the ratio between the respective flow rates of air passing through the two compressors 22a and 26a depends on the ratio between the powers of the two compressors 22a and 26a. However, immediately after the start of supercharging by the electric compressor 26a (that is, in the vicinity of the operating points P2 and Q2), the respective flow rates of air passing through the two compressors 22a and 26a are not in a state of being balanced at the ratio between the powers of the two compressors 22a and 26a, and consequently the operating point P moves from P2 toward P3 and the operating point Q moves from Q2 toward Q3.

When the operating point P and the operating point Q reach the operating points P3 and Q3, respectively, the flow rates of air passing through the two compressors 22a and 26a enter a state of being balanced at the ratio between the powers of the two compressors 22a and 26a. When a state in which balance is achieved is entered in this way, work (that is, supercharging) for raising the outlet pressure can be started in the turbo-compressor 22a also. As a result, the operating point P moves in the right-upper direction in FIG. 5A (that is, the direction of a high pressure ratio and a high flow rate) from the operating point P3. On the other hand, as a result of the contribution of supercharging by the turbo-compressor 22a, in a state in which the proportion of a change in the pressure ratio with respect to a change in the air flow rate is large in comparison to before the time point when the operating point Q reaches the operating point Q3, the operating point Q moves in the right-upper direction in FIG. 5B from the operating point Q3 (that is, the direction of a high pressure ratio and a high flow rate).

In the operation example shown in FIG. 5A and FIG. 5B in which the control of certain embodiments of the present disclosure is reflected, because the delay time Td is provided, supercharging of the electric compressor 26a is started in a state where the power of the turbo-compressor 22a is higher than that in the control example illustrated in FIG. 2A and FIG. 2B (more specifically, in a state where the turbo-supercharger 22 has recovered a work amount that is equivalent to an amount of energy ("energy A" described later) that is necessary to avoid a surge). As a result, unlike the control example shown in FIG. 2A and FIG. 2B in which the aforementioned consideration is not given to the timing for starting supercharging by the electric compressor 26a, even if the flow rate of air passing through the turbo-compressor 22a decreases accompanying the start of supercharging by the electric compressor 26a, the operating point P does not enter the surge region. That is, the occurrence of a surge in the turbo-compressor 22a accompanying the start of supercharging by the electric compressor 26a is suitably suppressed.

(Specific Processing in Embodiments of the Present Disclosure)

Figure 6:
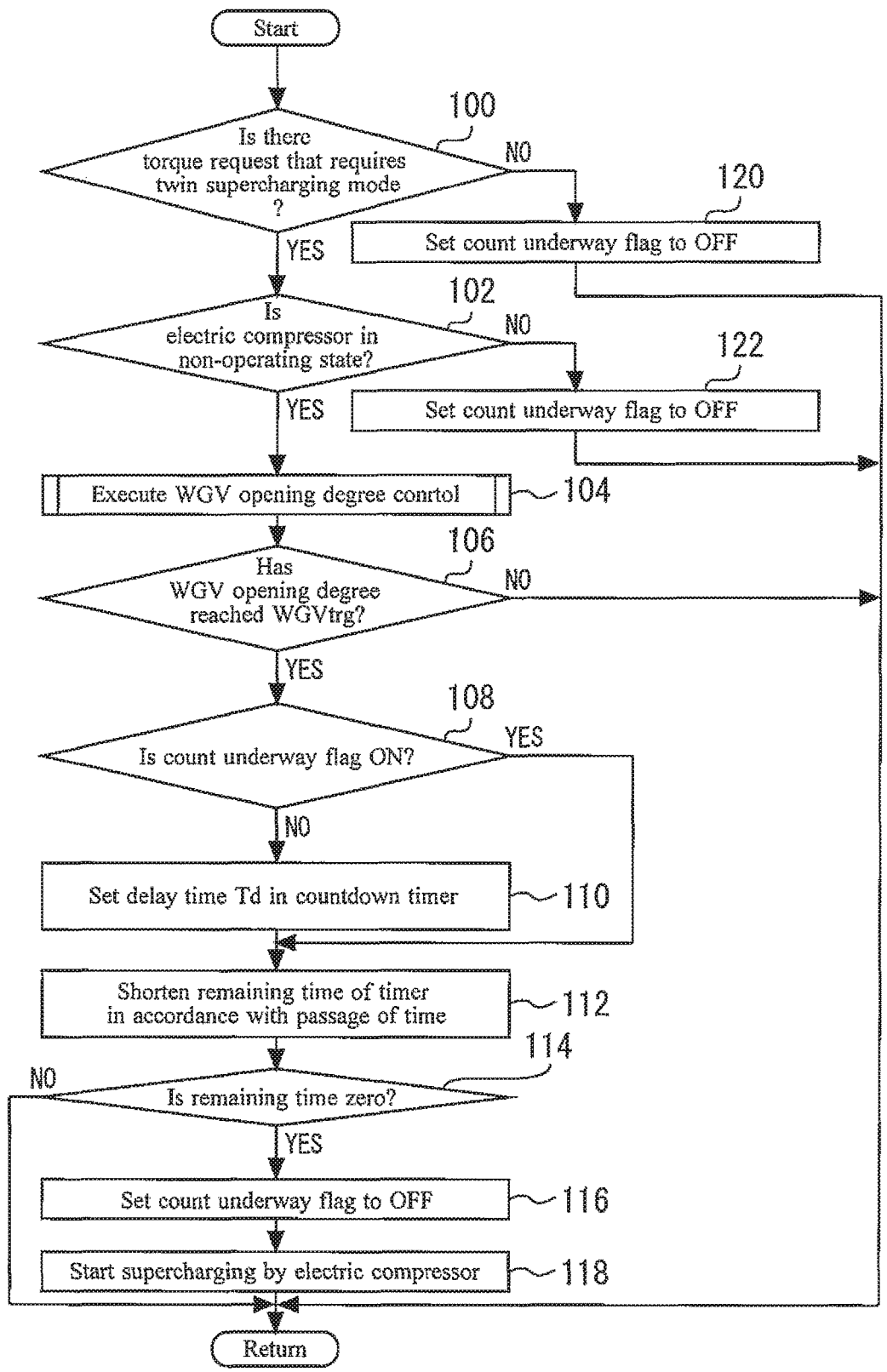
FIG. 6 is a main flowchart illustrating a flow of control according to embodiments of the present disclosure.

FIG. 6 is a main flowchart illustrating the flow of control according to the embodiments of the present disclosure. The ECU 46 is programmed to perform steps as shown in the flown chart of FIG. 6. As shown in FIG. 6, first, the ECU 46 proceeds to step 100 in which the ECU 46 determines whether or not there is a torque request (that is, a request to accelerate the vehicle) that requires the twin supercharging mode. A determination regarding whether or not there is a torque request can be made, for example, by using the accelerator position sensor 50 to determine whether or not an accelerator pedal is depressed. If there is no torque request, the current processing according to the present flowchart is promptly ended.

If it is determined in step 100 that there is a torque request that requires the twin supercharging mode, the ECU 46 proceeds to step 102. In step 102, the ECU 46 determines whether or not the electric compressor 26a is in a non-operating state at the current time point. If the result determined in step 102 is affirmative, the ECU 46 proceeds to step 104 in which the ECU 46 executes WGV opening degree control in accordance with the processing of a sub-flowchart shown in FIG. 7.

Figure 7:
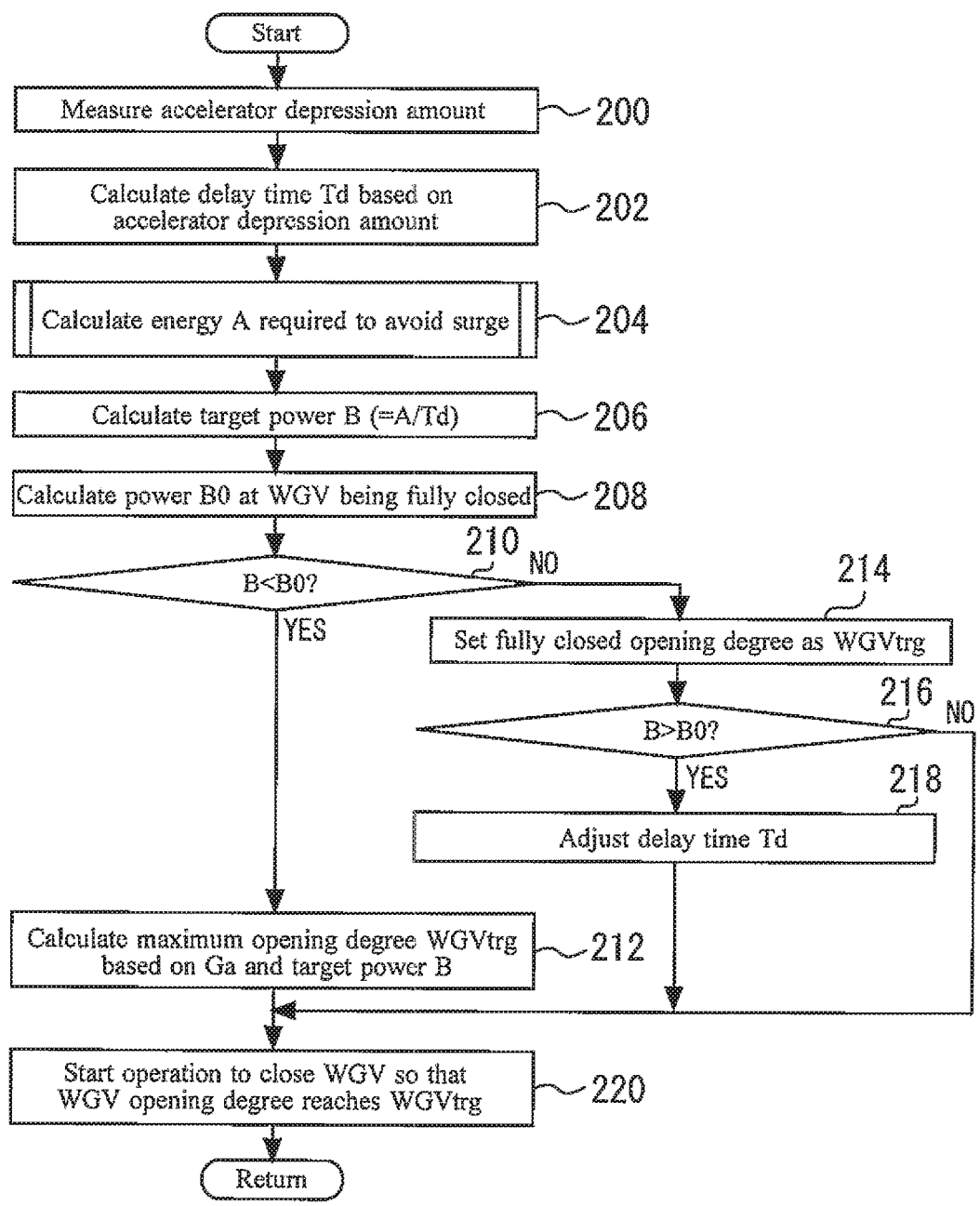
FIG. 7 is a flowchart illustrating a flow of waste gate valve (WGV) opening degree control in step 104 in the flowchart shown in FIG. 6.

FIG. 7 is a flowchart illustrating the flow of WGV opening degree control in step 104. The ECU 46 is programmed to perform steps as shown in the flown chart of FIG. 7. As shown in FIG. 7, first, in step 200, the ECU 46 measures the accelerator depression amount using the accelerator position sensor 50. Next, the ECU 46 proceeds to step 202 in which the ECU 46 calculates the delay time Td based on the measured accelerator depression amount.

Figure 8:
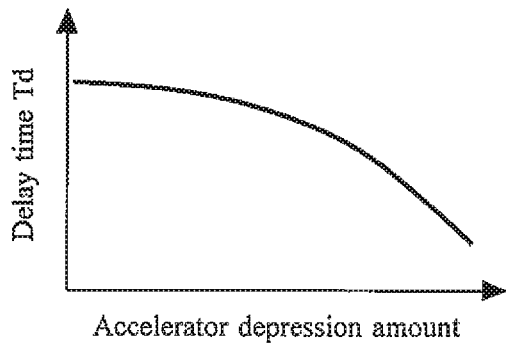
FIG. 8 is a view that illustrates an example of a setting of a map in which a relation between a delay time Td and an accelerator depression amount is defined.

FIG. 8 is a view that illustrates an example of a setting of a map in which the relation between the delay time Td and the accelerator depression amount is defined. When the degree of a torque request (acceleration request) is high, it is necessary to actuate the electric compressor 26a as quickly as possible. Therefore, according to the map shown in FIG. 8, the delay time Td is set so as to become gradually shorter as the accelerator depression amount increases. In step 202, the delay time Td is calculated by referring to such a map. Note that the delay time Td may be adjusted in accordance with at least one of the speed of the vehicle in which the internal combustion engine 10 is mounted, the engine speed and the engine torque.

Next, the ECU 46 proceeds to step 204. In step 204, the energy A (in units of Joules) that is required to avoid a surge in the turbo-compressor 22a is calculated in accordance with the processing of a sub-flowchart illustrated in FIG. 9.

Figure 9:
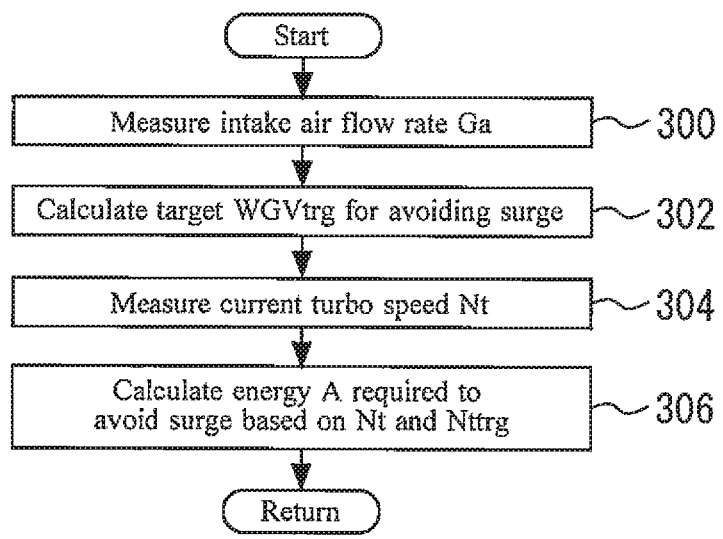
FIG. 9 is a flowchart illustrating a flow of processing for calculating an energy A in step 204 in the flowchart shown in FIG. 7.

FIG. 9 is a flowchart illustrating the flow of processing for calculating the energy A in step 204. As shown in FIG. 9, first the ECU 46 proceeds to step 300 in which the ECU 46 measures an intake air flow rate Ga using the air flow sensor 20. Next, the ECU 46 proceeds to step 302 to calculate a target turbo speed Nttrg that is a target value of a turbo speed Nt necessary to avoid a surge in the turbo-compressor 22a.

Figure 10:
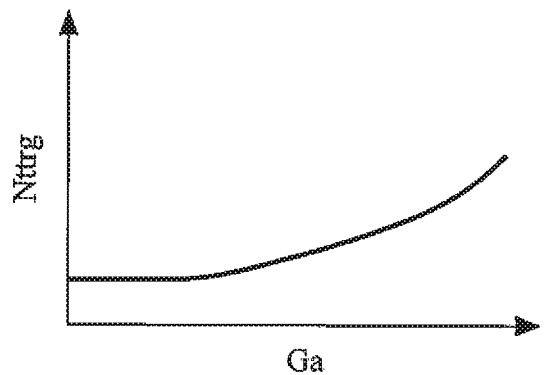
FIG. 10 is a view that represents an example of a setting of a map in which the relation between a target turbo speed Nttrg and an intake air flow rate Ga is defined.

FIG. 10 is a view that represents an example of a setting of a map in which the relation between the target turbo speed Nttrg and the intake air flow rate Ga is defined. According to the relation shown in FIG. 10, the target turbo speed Nttrg is set so as to gradually become higher as the intake air flow rate Ga increases. In step 302, the target turbo speed Nttrg is calculated based on the intake air flow rate Ga by referring to such a map.

Next, the ECU 46 proceeds to step 304 in which the ECU 46 measures the current turbo speed Nt using the turbo speed sensor 22d (when the ECU 46 proceeds to step 304 for the first time, the turbo speed Nt when the torque request that requires the twin supercharging mode is made is measured). Next, the ECU 46 proceeds to step 306. In step 306, the energy A that is required to avoid a surge in the turbo-compressor 22a is calculated based on the current turbo speed Nt and the target turbo speed Nttrg.

Figure 11:
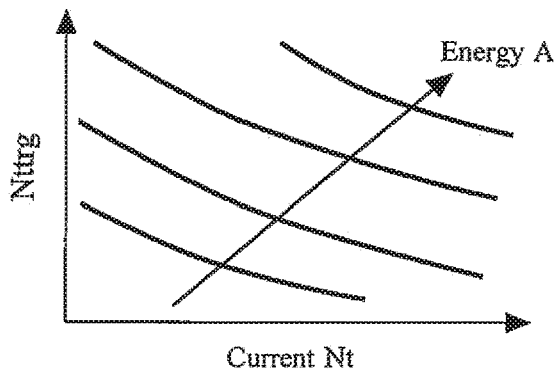
FIG. 11 is a view that represents an example of a setting of a map in which a relation between an energy A and a target turbo speed Nttrg and current turbo speed Nt is defined.

FIG. 11 is a view that represents an example of a setting of a map in which the relation between the energy A and the target turbo speed Nttrg and current turbo speed Nt is defined. According to the relation shown in FIG. 11, the energy A is set so as to increase as the target turbo speed Nttrg increases, or so as to increase as the current turbo speed Nt increases. In step 306, the energy A is calculated based on the current turbo speed Nt and the target turbo speed Nttrg by referring to such a map.

In the flowchart illustrated in FIG. 7, after the energy A is calculated in step 204, the ECU 46 proceeds to step 206. In step 206, a target power B of the turbo-compressor 22a is calculated. The target power B is calculated by dividing the energy A calculated in step 204 by the delay time Td calculated in step 202.

Figure 12:
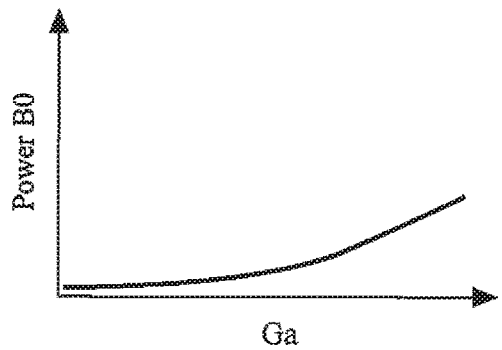
FIG. 12 is a view that represents an example of a setting of a map in which a relation between a power B0 and the intake air flow rate Ga is defined.

Next, the ECU 46 proceeds to step 208 in which the ECU 46 calculates the power B0 of the turbo-compressor 22a to be obtained when the WGV 42 is fully closed. FIG. 12 is a view that represents an example of a setting of a map in which the relation between the power B0 and the intake air flow rate Ga is defined. As shown in FIG. 12, the power B0 of the turbo-compressor 22a to be obtained when the WGV 42 is fully closed gradually increases as the intake air flow rate Ga increases. In step 208, the power B0 is calculated based on the intake air flow rate Ga by referring to such a map.

Next, the ECU 46 proceeds to step 210 in which the ECU 46 determines whether or not the target power B is lower than the power B0. If the result determined in step 210 is affirmative, that is, if a power that is lower than the power B0 is required as the target power B, the ECU 46 proceeds to step 212. In step 212, the target WGV opening degree WGVtrg is calculated based on the intake air flow rate Ga and the target power B. More specifically, the target WGV opening degree WGVtrg corresponds to the maximum WGV opening degree that is required to avoid a surge in the turbo-compressor 22a under the current intake air flow rate Ga and target power B.

Figure 13:
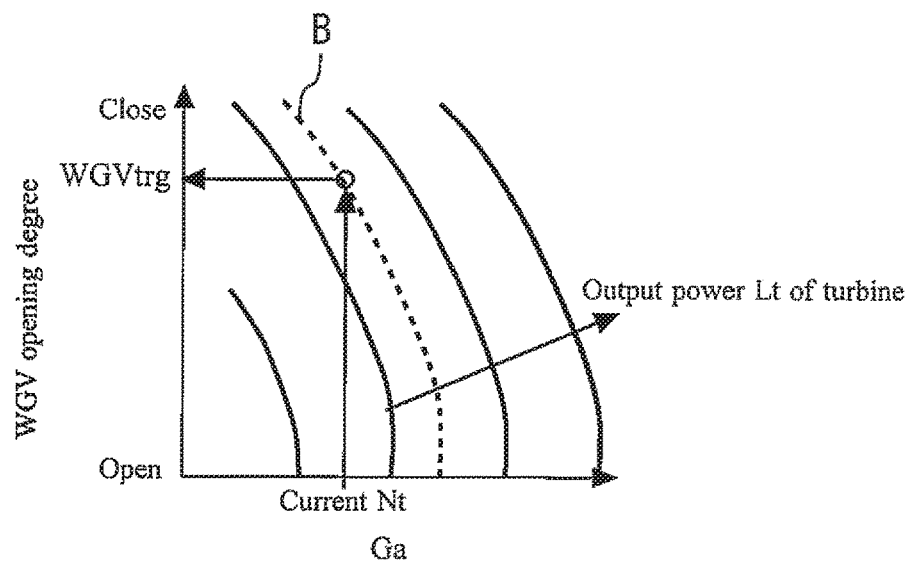
FIG. 13 is a view that represents a relation between an output power Lt of a turbine, the intake air flow rate Ga and a WGV opening degree.

FIG. 13 is a view that represents the relation between an output power Lt of the turbine 22b, the intake air flow rate Ga and the WGV opening degree. By storing the relation shown in FIG. 13 as a map in the ECU 46, the maximum WGV opening degree that is required for realizing the output power Lt of the turbine 22b that is taken as a target under the current intake air flow rate Ga can be calculated utilizing this relation. The aforementioned target power B is, more specifically, a target value of the output power Lt of the turbine 22b, and the (driving) power of the turbo-compressor 22a is a value that is obtained by subtracting bearing loss (a known value) of the turbo-supercharger 22 from the output power Lt of the turbine 22b. In step 212, the target WGV opening degree WGVtrg is calculated based on the target power B and the current intake air flow rate Ga by referring to a map in which a relation as shown in FIG. 13 is defined (the example illustrated in FIG. 4A and FIG. 4B corresponds to this).

On the other hand, if the result of the determination in step 210 is negative, that is, if a power equal to or greater than the power B0 is required as the target power B, the ECU 46 proceeds to step 214. In step 214, the fully closed opening degree is set as the target WGV opening degree WGVtrg (the example illustrated in FIG. 3A and FIG. 3B corresponds to this).

After the processing in step 214, the ECU 46 determines whether or not the target power B is higher than the power B0 (step 216). As described above, in the disclosed embodiments of the present disclosure, the target power B is calculated by dividing the energy A necessary for avoiding a surge by the delay time Td, and the delay time Td is set to a value in accordance with the accelerator depression amount. Accordingly, when the result of the determination in step 216 is affirmative (that is, when a higher power than the power B0 is required as the target power B), if a value of the delay time Td that is in accordance with the accelerator depression amount is used, the energy A cannot be obtained even after the delay time Td elapses under the power B0. Therefore, the ECU 46 proceeds to step 218 in which the ECU 46 adjusts the delay time Td so as to become a value obtained by dividing the product of the target power B and the delay time Td by the power B0 (=B/B0×Td). Note that, if the result of the determination in step 216 is negative (that is, if the target power B and the power B0 are equal), it is not necessary to adjust the delay time Td.

After the processing in step 212 or the processing in step 218, the ECU 46 proceeds to step 220 in which the ECU 46 starts an operation that closes the WGV 42 so that the WGV opening degree reaches the target WGV opening degree WGVtrg. In accompaniment therewith, the power of the turbo-compressor 22a starts to increase.

As shown in the flowchart illustrated in FIG. 6, after executing the WGV opening degree control in step 104, the ECU 46 proceeds to step 106. In step 106, the ECU 46 determines whether or not the WGV opening degree has reached the target WGV opening degree WGVtrg. As a result, if the result determined in step 106 is negative, execution of the processing from step 100 onward is repeated.

On the other hand, if it is determined in step 106 that the WGV opening degree has reached at the target WGV opening degree WGVtrg, the ECU 46 proceeds to step 108. In step 108, the ECU 46 determines whether or not a count underway flag which indicates that counting of the delay time Td is underway is "ON".

If it is determined in step 108 that the count underway flag is not "ON", the ECU 46 proceeds to step 110 in which the ECU 46 sets the count underway flag to "ON" and also sets the delay time Td in a countdown timer that is one of the functions of the ECU 46. Next, the ECU 46 proceeds to step 112 in which the ECU 46 executes processing for subtracting, from the remaining time of the countdown timer, the amount of time that has passed from the time point of execution of the processing in step 110. On the other hand, if it is determined in step 108 that the count underway flag is "ON", the ECU 46 immediately proceeds to step 112.

After executing the processing in step 112, the ECU 46 proceeds to step 114. In step 114, the ECU 46 determines whether or not the remaining time of the countdown timer is zero. If the result determined in step 114 is negative, execution of the processing from step 100 onward is repeated.

In contrast, if it is determined in step 114 that the remaining time of the countdown timer is zero, the ECU 46 proceeds to step 116 in which the ECU 46 sets the count underway flag to "OFF". Next, the ECU 46 proceeds to step 118. In step 118 the ECU 46 controls energization of the electric motor 26b to start supercharging by the electric compressor 26a. Note that, the count underway flag is also set to "OFF" when the result determined in step 100 or step 102 is negative (step 120 or 122).

According to the processing in the flowcharts illustrated in FIG. 6, FIG. 7 and FIG. 9 described above, the energy A is calculated. The energy A is required in order to avoid a surge in the turbo-compressor 22a that is caused by a fact that actuation of the electric compressor 26a is started when the twin supercharging mode is required. Further, based on the energy A (in units of Joules) and the above described delay time Td, the target power B of the turbo-compressor 22a is calculated as a value that is obtained by dividing the energy A by the delay time Td (B=A/Td). According to this relation between the energy A, the delay time Td and the target power B, it can be said that, after the turbo-compressor 22a is operated throughout the delay time Td under the target power B, during the delay time Td the turbo-supercharger 22 has recovered a work amount that is equivalent to the energy A required to avoid a surge.

According to the above described processing, if the target power B is lower than the power B0 to be obtained when the WGV is fully closed, the opening degree WGV1 (WGV opening degree that is larger than the fully closed opening degree) that satisfies the target power B under the current intake air flow rate Ga is set as the target WGV opening degree WGVtrg. Further, if the target power B is lower than the power B0, supercharging by the electric compressor 26a is started upon the elapse of the delay time Td that is started when the WGV opening degree reaches the target WGV opening degree WGVtrg (that is, after the power of the turbo-compressor 22a increases to a value equal to or greater than the designated power value C1). The designated power value C1 is obtained by subtracting the aforementioned bearing loss from the target power B. Therefore, a surge in the turbo-compressor 22a accompanying the start of supercharging by the electric compressor 26a can be favorably prevented from occurring.

Further, according to the above described processing, if the target power B is equal to or greater than the power B0 to be obtained when the WGV is fully closed, the fully closed opening degree is set as the target WGV opening degree WGVtrg. Further, if the target power B is equal to or greater than the power B0, supercharging by the electric compressor 26a is started upon the elapse of the delay time Td that is started when the WGV opening degree reaches the target WGV opening degree WGVtrg (that is, after the power of the turbo-compressor 22a increases to a value equal to or greater than the designated power value C2). The designated power value C2 is obtained by subtracting the aforementioned bearing loss from the power B0. The delay time Td may be adjusted by the processing in step 218. Therefore, in this situation also, a surge in the turbo-compressor 22a accompanying the start of supercharging by the electric compressor 26a can be favorably prevented from occurring.

Further, according to the control of certain embodiments of the present disclosure, the delay time Td is set so as to become shorter as the accelerator depression amount increases (that is, the higher that the degree of a request to increase the engine torque is, the shorter the delay time Td becomes) as shown in FIG. 8, with the exception of where the target power B is higher than the power B0 to be obtained when the WGV is fully closed. Lengthening of the delay time Td leads to a decrease in the acceleration response. Therefore, by deciding the delay time Td in accordance with the degree of the aforementioned request, occurrence of a surge can be suppressed while taking into consideration the degree of a torque request (request to accelerate the vehicle) that is made by a driver of the vehicle.

Further, according to the control of certain embodiments of the present disclosure that utilizes the above described relation (B=A/Td), the target power (target value of the output power Lt of the turbine 22b) B is set so as to become lower as the delay time Td becomes longer. As a result, the aforementioned designated power value C1 of the power of the turbo-compressor 22a that has a correlation with the output power Lt of the turbine 22b is also set so as to become lower as the delay time Td becomes longer. By this means, the target power B (in other words, the designated power value C1) can be set as a value for applying, to the WGV opening degree, the required minimum change in accordance with the size of the delay time Td.

Note that, in the embodiments of the present disclosure, the turbo-compressor 22a corresponds to a "first compressor" according to the present disclosure, the exhaust bypass passage 40 and the WGV 42 correspond to a "exhaust energy adjustment device" according to the present disclosure, the electric compressor 26a corresponds to a "second compressor" according to the present disclosure, and the electric motor 26b, the motor controller 28 and the battery 30 correspond to a "supercharging control device" according to the present disclosure. Further, the ECU 46 that executes processing according to the flowcharts illustrated in FIG. 6, FIG. 7 and FIG. 9 corresponds to "supercharging control means" according to the present disclosure. Further, the designated power value C1 corresponding to the target power B, or the designated power value C2 corresponding to the power B0 to be obtained when the WGV is fully closed corresponds to a "designated power value" according to the present disclosure.

As shown in FIGS. 3A and 3B and FIGS. 4A and 4B, supercharging by the electric compressor 26a is started by starting energization of the electric motor 26b when the delay time Td elapses. However, "a time of starting supercharging by the second compressor" in the present disclosure is not limited to "a time of starting energization of the electric motor 26b" in the above described manner, and for example, may be a time as described hereunder.

For an internal combustion engine equipped with an electric compressor that corresponds to a second compressor, an intake bypass passage that bypasses the electric compressor, and an intake bypass valve that opens and closes the intake bypass passage, performance of preliminary rotation control that, by increasing the speed of the electric compressor in advance by actuating the electric compressor in a state in which the intake bypass valve is open, makes it possible to quickly obtain a desired supercharging pressure when supercharging is started is known. In an example where this kind of preliminary rotation control is utilized, energization for preliminary rotation is performed without waiting for the elapse of the delay time Td. Specifically, if processing according to the above described flowchart illustrated in FIG. 6 is performed, for example, the energization for preliminary rotation is started when the result determined in step 102 is affirmative, or when the result determined in step 106 is affirmative. However, supercharging by the electric compressor is not started when only energization for preliminary rotation is performed. In the present configuration, by closing the intake bypass valve and increasing the electric motor output accompanying the elapse of the delay time Td, the rotational speed of the electric compressor starts to become higher than the rotational speed at the time of the preliminary rotation control. Accordingly, in this configuration, "a time of closing the intake bypass valve", in other words "a time when the speed of the electric compressor starts to become higher than the speed at a time of the preliminary rotation control" corresponds to "a time of starting supercharging by the second compressor".

Further, in the disclosed embodiments of the present disclosure, the internal combustion engine 10 that is equipped with the exhaust bypass passage 40 and the WGV 42 for adjusting the amount of exhaust energy that the turbine 22b recovers is described as an example. However, the "exhaust energy adjustment device" according to the present disclosure may be, for example, a variable nozzle device incorporated into a turbo-supercharger that has a turbo-compressor as the first compressor. If utilizing such a variable nozzle device, in a situation where supercharging by the second compressor is necessary at a time of a request to increase the engine torque, supercharging by the second compressor may be started upon the elapse of the delay time Td that is started when the power of the first compressor is increased to a designated power value or more by controlling the opening degree of the variable nozzle to the closed side.

Furthermore, the internal combustion engine 10 that is equipped with the electric compressor 26a is described as an example. However, the "second compressor" according to the present disclosure may be, for example, a compressor of a mechanical supercharger that uses the torque of the crankshaft of the internal combustion engine as a motive power. If the mechanical supercharger is used, the "supercharging control device" may be implemented, for example, by a device that includes an intake bypass passage that bypasses the compressor of the mechanical supercharger, and an intake bypass valve that is configured to open the intake bypass passage when supercharging by the compressor is not performed and to close the intake bypass passage when starting supercharging. Further, apart from such a device, for example, a clutch device that is configured to switch between a state in which the crankshaft and a rotary shaft of the compressor of the mechanical supercharger are connected and a state in which such a connection is released corresponds to the "supercharging control device".

Further, although the spark-ignition internal combustion engine 10 is described as an example according to the present disclosure, the present disclosure is also applicable to a compression-ignition internal combustion engine such as a diesel engine.

The invention claimed is:

1. An internal combustion engine comprising:
    a turbine arranged in an exhaust passage of the internal combustion engine and configured to be driven by exhaust gas;
    a first compressor arranged in an intake passage of the internal combustion engine and configured to be driven by the turbine and to supercharge intake air;
    an exhaust energy adjustment device configured to adjust an amount of exhaust energy recovered by the turbine and by controlling an amount of the exhaust gas in the exhaust passage that is directed to the turbine during operation of the internal combustion engine to thereby change a power of the first compressor;
    a second compressor arranged in the intake passage and configured to be driven by a power other than exhaust gas and to supercharge intake air;
        wherein the intake passage on a downstream side of the first compressor is connected to the intake passage on a downstream side of the second compressor;
    a supercharging control device configured to switch between execution of supercharging by the second compressor when the second compressor is driven with the power other than exhaust gas and stopping supercharging by the second compressor when the second compressor is no longer driven with the power other than exhaust gas; and
    a control apparatus comprising an internal combustion engine controller;
        wherein the internal combustion engine controller includes a non-transitory computer-readable memory storing executable-programmed instructions to:
            control the exhaust energy adjustment device such that, when supercharging by the second compressor is required at a time of a request to increase engine torque, the power of the first compressor is increased to a designated power value or greater than the designated power value by increasing an amount of the exhaust gas directed to the turbine; and
            control the supercharging control device such that, upon an elapse of a delay time that is started when the power of the first compressor is increased to the designated power value or greater than the designated power value, supercharging by the second compressor is started by driving the second compressor with the power other than exhaust gas.

2. The internal combustion engine according to claim 1, wherein the controller further includes executable-programmed instructions to set the delay time to a value that is shorter when the request to increase engine torque is a request to increase engine torque by a greater amount and to a value that is longer when the request to increase engine torque is a request to increase engine torque by a lesser amount.

3. The internal combustion engine according to claim 2, wherein the controller further includes executable-programmed instructions to set the designated power value of the power of the first compressor to a value that is smaller when the delay time is longer and to a value that is larger when the delay time is shorter.

* * * * *